Aug. 16, 1932.  H. M. CAMERON  1,871,659
WEIGHING SCALE
Filed June 20, 1930   2 Sheets-Sheet 1

INVENTOR
HUGH M. CAMERON
BY J. S. Wooster
ATTORNEY

Aug. 16, 1932.  H. M. CAMERON  1,871,659
WEIGHING SCALE
Filed June 20, 1930  2 Sheets-Sheet 2
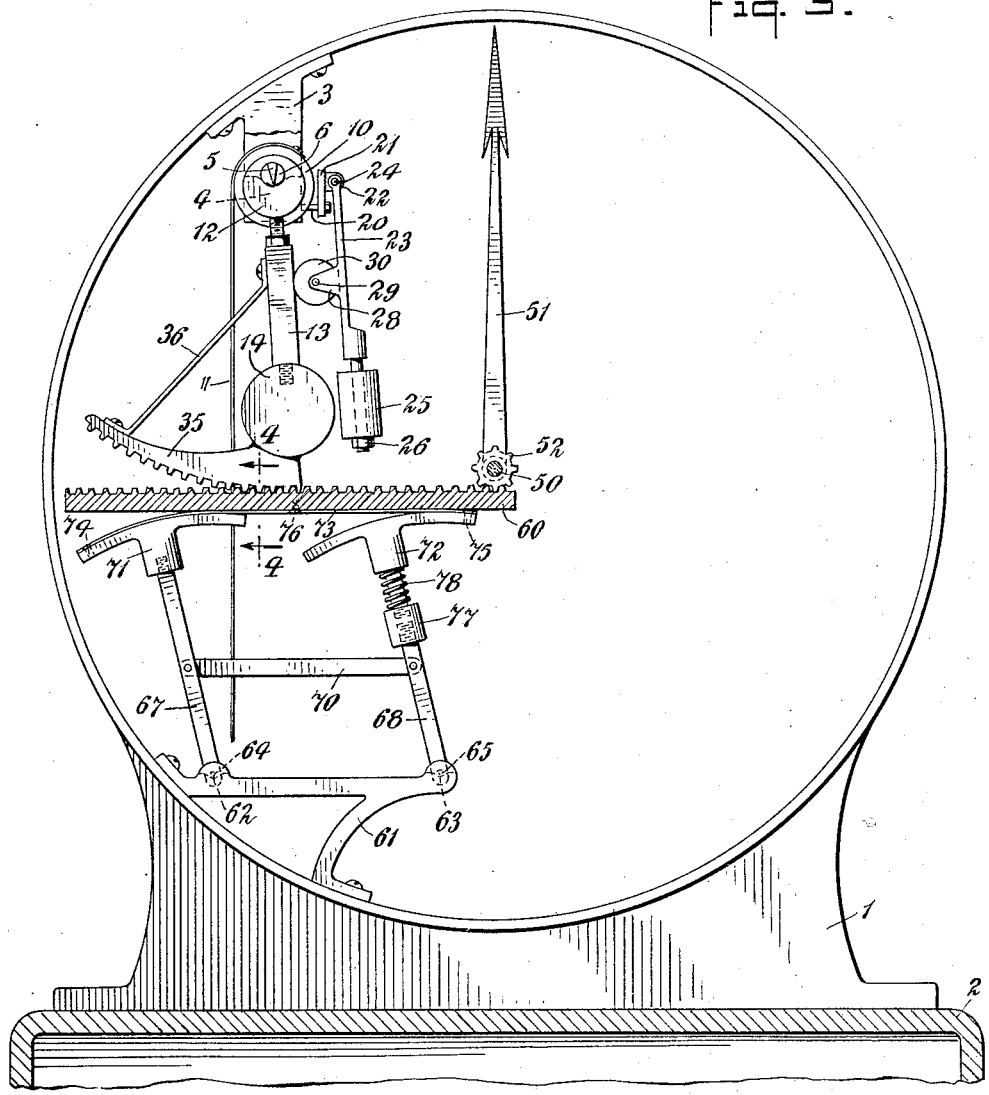
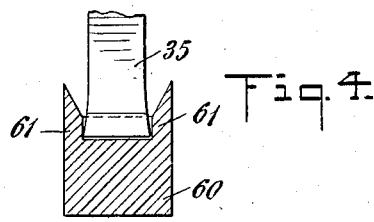
INVENTOR
HUGH M. CAMERON
BY
J. S. Wooster
ATTORNEY Patented Aug. 16, 1932

1,871,659

UNITED STATES PATENT OFFICE

HUGH M. CAMERON, OF WOODHAVEN, NEW YORK, ASSIGNOR TO JOHN CHATILLON & SONS, OF NEW YORK, N. Y., A CORPORATION OF NEW YORK

WEIGHING SCALE

Application filed June 20, 1930. Serial No. 462,683.

This invention relates to weighing scales, and more particularly to those scales having an indicator driven through a pinion.

Since the advent of the so called "projecting" scales wherein the weight reading, magnified many times, is thrown on a screen, it has been found necessary to eliminate even the slightest error in the travel of the indicator as such errors, due to the magnification, are objectionably noticeable. Also, the ordinary standard of accuracy in all scales has become far stricter than formerly and errors that were heretofore considered negligible are now extremely detrimental to the commercial success of scales for many purposes.

An object of this invention is to provide a scale structure which fully meets the standard of accuracy required in "projecting" scales and other scales today.

In my copending application on weighing scale, a counter-balancing mechanism employing a pendulum movement is disclosed. By means of that structure errors in the lever movement of a scale and in the travel distance of a counter-balancing pendulum can be corrected, thus providing a scale of great accuracy. However, the counter-balancing mechanism therein disclosed or any other counter-balancing mechanism can only correct errors up to the point at which it is interconnected in the lever system connecting the indicator with the load supporting platform or equivalent load supporting means. The indicator is driven by movement taken from the load counter-balancing means and, although the load counter-balancing mechanism moves in exact proportion to the load applied, the means heretofore known in the art through which indicators have been driven, is not entirely accurate.

Such means have heretofore usually comprised a rack carried by one of the moving parts of the scale and engaging the pinion through which the pointer is driven. The rack is held against the pinion by a weight or spring. The angle of the rack bar is not the same at all positions relative to the pinion and the friction between rack and pinion is not constant as the rack bar moves. As a result errors occur in the weight readings regardless of how accurate the scale is up to the point at which the rack bar is interconnected.

A particular object of the present invention is to provide a construction in which the angle of the rack bar remains constant as it travels and the friction between rack bar and pinion is constant so that it can be calculated and eliminated.

The present invention comprises a rack bar adapted to cooperate with the pinion through which the scale is driven and a moving part of the scale such as a lever in the scale lever system, a counter-balancing mechanism, or any part of the scale adapted to move in proportion to the load applied to the scale, and means for supporting the rack bar independently of the moving parts of the scale and in such way that the angle of the rack bar to the pinion is constant, and also, the friction between the rack bar and the pinion is constant so that it can be accurately calculated and compensated for.

Others objects and advantages of the invention will be apparent in the following description in which reference is had to the accompanying drawings, illustrating two preferred embodiments of my invention and wherein similar reference numerals designate similar parts in the several views.

The drawings:

Fig. 3 is a front elevational view of a scale embodying a modified form of my invention, the front of the casing being removed and parts broken away for the sake of clarity;

Fig. 4 is a section on the line 4—4 of Fig. 3.

Figure 1:
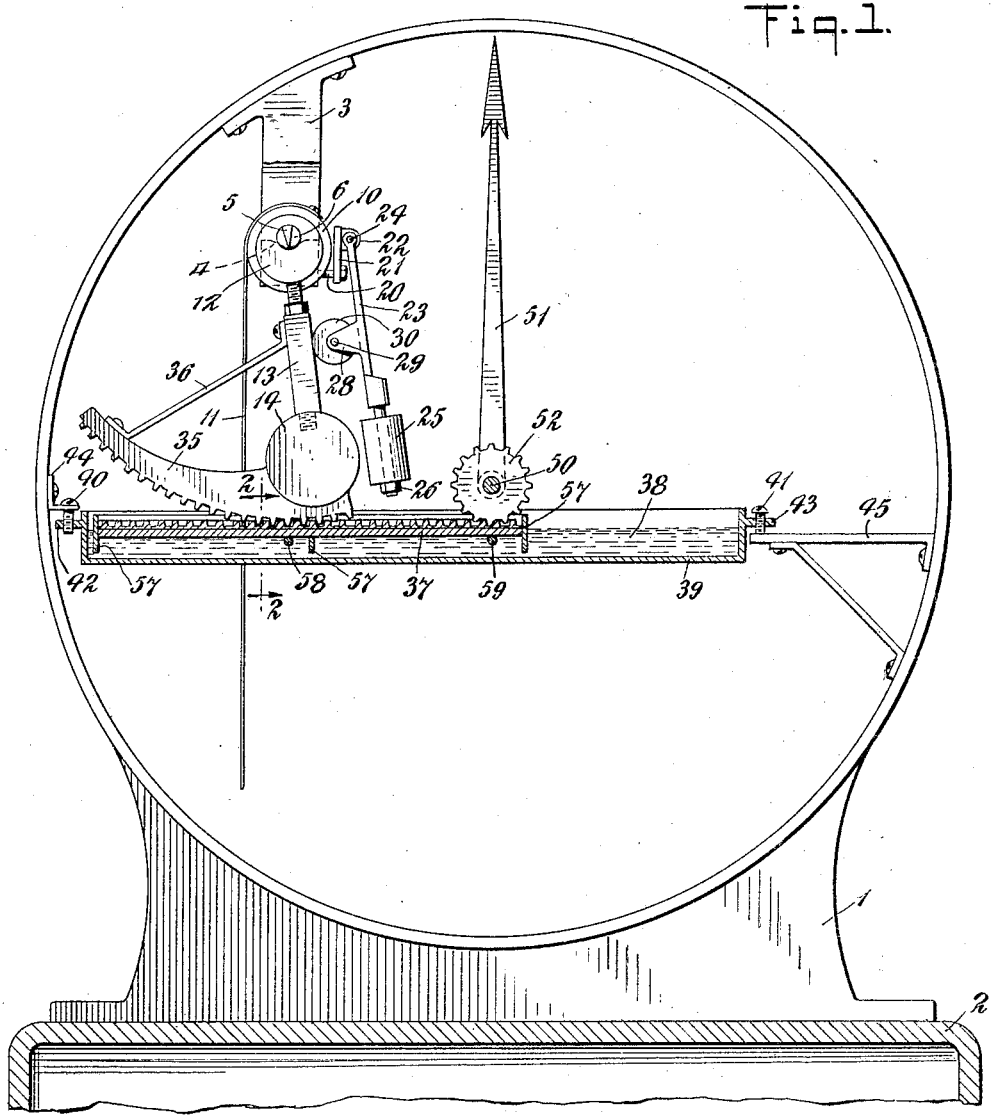
Fig. 1 is a front elevational view of a scale embodying one form of my invention, the front of the casing being removed and parts broken away for the sake of clarity.
Figure 2:
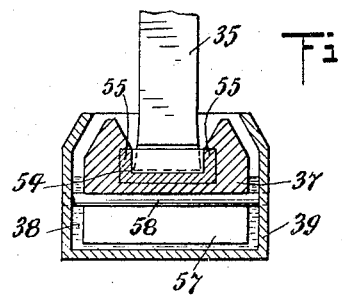
Fig. 2 is a section on the line 2—2 of Fig. 1.

Referring to the scale illustrated in Figs. 1 and 2 of the drawings, 1 designates the casing which houses the scale mechanism except for the load platform or other supporting means. This housing is supported on the base 2, the top of which is only shown, said base being of any conventional design and not forming any part of the present invention. The top of the casing 1 carries depending bracket 3 provided with inwardly projecting knife edge bearings 4, only one of which is shown, a portion of bracket 3 being broken away to show the construction more clearly. The knife edges 5 formed at each end of the shaft 6 rest on the knife edge bearings 4. This shaft 6 carries a wheel 10 and the axis of the pivots of shaft 6 passes through the center of wheel 10 as shown in Fig. 1, said wheel 10 being therefore true-centered with respect to the axis of the pivot of shaft 6. A flexible tape 11 is anchored on the periphery of wheel 10 at one end, the other end of said tape being adapted to be fastened to any moving part of the scale lever system. As the load platform and lever system of the scale may be of any conventional design and not forming a part of the present invention, they are not shown.

The shaft 6 carries in fixed relation thereto a primary pendulum comprising the collar 12, stem 13, and weight 14. A pair of horizontally extending bolts 20, only one of which is shown, carried by depending bracket 3 hold a crossframe member 21 which is provided with an extending ear 22 with a bearing therein. A secondary pendulum comprising the stem 23 bifurcated at its top is pivotally mounted by means of the pin 24 passing through the bearing provided in the ear 22 and oppositely disposed bearings in the bifurcated top of the stem 23. The stem 23 carries the weight 25 at its lower end, said weight being adjustably mounted by means of the nut 26, so that the effective length of the secondary pendulum may be changed. A U-shaped bracket 28 is mounted on the stem 23 and carries the shaft 29 on which the wheel 30 is rotatably mounted.

The construction of the scale so far is the same as that shown in my copending application on weighing scale. When the primary pendulum is vertical, the secondary pendulum also lies in vertical position and the wheel 30 will touch the stem 13 of the primary pendulum but will exert no pressure thereagainst. As the tape 11 is pulled down by a load placed on the load platform, it will tend to turn the shaft 6, thereby swinging the primary pendulum to the right, viewing Figure 1. If this pendulum moves to the right, it will also move the secondary pendulum to the right by engagement with the wheel 30, said secondary pendulum being free-swinging except for contact with the primary pendulum. Obviously, since the secondary pendulum is pivoted at a point to the right of the pivot of the primary pendulum, as said primary pendulum moves to the right, the point at which the wheel 30 engages the stem 13 of the primary pendulum will gradually approach the lower end of said primary pendulum, thereby progressively increasing the force with which the secondary pendulum opposes movement of the primary pendulum as it counterbalances the load. By proportioning the relative weight and effective length of the two pendulums, this progressively increasing force by which movement of the primary pendulum is opposed can be made to counteract the known tendency of a single pendulum to increase its travel distance progressively for equal units of applied weight as it moves from vertical position where the load exerts a stress on a tape attached to the periphery of a wheel true-centered with respect to the axis about which said pendulum pivots.

In this way all errors in lever and pendulum movement can be corrected so that the primary pendulum will travel equal distances for equal units of weight applied to the load platform.

A gear segment 35 is attached to the weight 14 of the primary pendulum and also, by means of the brace 36, to the stem 13 of the primary pendulum. The teeth of this gear segment are adapted to cooperate with a rack bar 37 floating on a bath 38 of mercury or other liquid of high specific gravity contained in the elongated horizontally disposed vessel 39, which is held in position by means of screws 40 and 41 passing through threaded openings in the ears 42 and 43, respectively, formed as part of the vessel 39 and through threaded openings in the brackets 44 and 45, respectively, said brackets being carried by the casing 1.

A shaft 50 is journaled in the casing 1 and carries at one end the pointer 51 adapted to travel over the face of a circular graduated scale and at the other end the pinion 52. The bottom of this pinion and of the gear segment 35 are in the same horizontal plane and the rack bar 37 is adapted to engage both while floating in horizontal position on the mercury bath.

As shown more clearly in Fig. 2, the upper part of the side walls of the vessel 39 are sloped inwardly to prevent accidental spilling of the mercury in moving the scale. It is preferred to make the body of the rack bar 37 of some light material such as aluminum and have a longitudinal piece 54 of harder material such as steel, brass etc. inserted therein and provided with teeth. The width of the teeth in rack bar 37 is made slightly greater than the width of the teeth of the gear segment 35 and pinion 52 and the rack bar is extended up beyond the teeth therein as shown at 55. By this arrangement the rack bar is accurately guided in its proper path through the teeth of gear segment 35 and pinion 52 and does not contact with the vessel 39.

To reduce oscillation of the pointer, the bottom of rack bar 37 is provided with one or more blocks 57 which extend nearly to the bottom of vessel 39. These blocks operate similarly to the conventional dash pot mechanism.

In actual operation, there is some tendency for the rack bar floating on the mercury to skip a tooth of the pinion 52 or gear segment 35, particularly when a weight is suddenly applied to the scale. To prevent this, pins 58 and 59 are transversely mounted in vessel 39 under the points at which the rack bar 37 engages the gear segment 35 and pinion 52. The height of these pins is carefully regulated so as to allow the rack bar to float freely on the mercury bath and yet prevent it from being pushed down sufficiently to allow the teeth of the rack to disengage the teeth of the rack and gear segment. It will be understood that the pins 58 and 59 only function when a weight has suddenly been applied to the scale and the rack bar 37 is moving rapidly. When the indicator 51 has come to rest or nearly so, the rack bar will be floating on the mercury bath free of the pins.

From the above description, it will be seen that in this scale structure the rack bar is carried independently of the moving parts of the scale and that the friction between rack bar and the scale parts is constant and also very small. The angle of the rack bar likewise remains the same at all positions of pointer 51.

In Figs. 3 and 4 another modification of the present invention is shown in which all parts of the structure are identical with the structure shown in Figs. 1 and 2 except for the rack bar and means for supporting same. In Figs. 3 and 4, the rack bar 60 can be made in one piece as shown in Fig. 4 or of two pieces as shown in Fig. 2. The rack bar 60 is provided with longitudinal portions 61 extending on either side above the teeth in the rack bar whereby the rack bar is guided by the teeth of gear segment 37 and pinion 52.

In this modification of the invention, a bracket 61 is secured to the casing 1. This bracket is provided with two pairs of knife edge bearings, 62 and 63 (only one of each pair being shown) adapted to receive knife edges 64 and 65 extending laterally from bars 67 and 68 which are pivotally connected intermediate their ends by the link 70. As shown in Fig. 3, the pivots of the two bars are in the same horizontal plane. The bar 67 is threaded at its upper end and carries arcuate member 71. Arcuate member 72 is disposed on the upper end of rod 68 which fits in an opening in said member provided therefor. A flexible tape 73 is attached at 74 to arcuate member 71 and at 75 to arcuate member 72.

Rack bar 60 rests on flexible tape 73 and is fastened thereto at 76. When engaging gear segment 37 and pinion 52, rack bar 60 will be horizontally disposed as the lower part of the segment and pinion are in the same horizontal plane. Arcuate member 71 is adjusted to hold the rack in engagement with gear segment 37 and arcuate member 72 is yieldingly urged upward by nut 77 disposed on a threaded portion of rod 68 and helical spring 78, thereby holding rack bar 60 against pinion 52.

As in the modification of the invention shown in Figs. 1 and 2, so here the rack bar is supported independently of the moving parts of the scale and the angle of the rack bar remains constant at all positions of the pointer 51. The friction caused by the rack bar is very small and is constant and therefore can be calculated and counteracted in adjusting the scale.

Two modifications of the invention have been illustrated whereby the errors due to varying the angle of the rack and varying friction between the rack and the moving parts of the scale are eliminated but it is to be understood that the invention can be carried out in other ways and is not to be restricted except as recited in the claims appended hereto.

The invention claimed is:

1. In a weighing scale having an indicator, a pinion through which the indicator is driven, and a member adapted to move in proportion to loads applied to the scale, a rack bar in positive operative connection with the pinion and the member substantially in the same plane, and means for supporting said rack bar independently of the moving parts of the scale.

2. In a weighing scale having an indicator, a pinion through which the indicator is driven, and a member adapted to move in proportion to loads applied to the scale, a rack bar positioned beneath and in positive operative connection with the pinion and the member substantially in the same plane, and means for supporting said rack bar independently of the moving parts of the scale.

3. In a weighing scale having an indicator, a pinion through which the indicator is driven, and a load counterbalancing mechanism including a pendulum adapted to move in proportion to loads applied to the scale, a gear segment carried by said pendulum, a rack bar positioned beneath and meshing with the pinion and gear segment, and means for supporting said rack bar independently of the moving parts of the scale.

4. In a weighing scale having an indicator, a pinion through which the indicator is driven, and a load counterbalancing mechanism including a pendulum adapted to move in proportion to loads applied to the scale, a gear segment carried by said pendulum, the bottoms of the gear segment and the pinion being in the same horizontal plane, a rack bar positioned beneath and meshing with the gear segment and the pinion, and means for supporting said rack bar in horizontal position independently of the moving parts of the scale.

5. In a weighing scale having an indicator, a pinion through which the indicator is driven, and a load counterbalancing mechanism including a pendulum adapted to move in proportion to loads applied to the scale, a gear segment carried by said pendulum, the bottoms of the gear segment and the pinion being in the same horizontal plane, a rack bar engaging the gear segment and the pinion, and an elongated mercury bath disposed beneath the gear segment and pinion on which the rack bar floats.

6. In a weighing scale having an indicator, a pinion through which the indicator is driven, and a load counterbalancing mechanism including a pendulum adapted to move in proportion to loads applied to the scale, a gear segment carried by the pendulum, the bottom of the gear segment and pinion being in the same horizontal plane, an elongated horizontally disposed vessel extending under the gear segment and pinion, a high specific gravity liquid partially filling the vessel, and a rack bar having a lower specific gravity than the liquid floating thereon and engaging the gear segment and pinion.

7. In a weighing scale having an indicator, a pinion through which the indicator is driven, and a load counterbalancing mechanism including a pendulum adapted to move in proportion to loads applied to the scale, a gear segment carried by the pendulum, the bottom of the gear segment and pinion being in the same horizontal plane, an elongated horizontally disposed vessel extending under the gear segment and pinion, mercury partially filling the vessel, a rack bar floating on the mercury and engaging the gear segment and pinion, and means for preventing the rack bar from skipping teeth of the gear segment and pinion while allowing the rack bar to float freely on the mercury.

8. In a weighing scale having an indicator, a pinion through which the indicator is driven, and a load counterbalancing mechanism including a pendulum adapted to move in proportion to loads applied to the scale, a gear segment carried by the pendulum, the bottom of the gear segment and pinion being in the same horizontal plane, an elongated horizontally disposed vessel extending under the gear segment and pinion, mercury partially filling the vessel, a rack bar floating on the mercury and engaging the gear segment and pinion, and pins horizontally disposed across said vessel under the rack bar at the points where the rack bar engages the gear segment and the pinion, the level of the pins being such as to allow the rack bar to float freely thereabove when the teeth of the rack bar are meshed with the teeth of the gear segment and pinion but to prevent the rack bar from skipping teeth of the gear segment or pinion.

9. In a weighing scale having an indicator, a pinion through which the indicator is driven, and a load counterbalancing mechanism including a pendulum adapted to move in proportion to loads applied to the scale, a gear segment carried by the pendulum, the bottoms of the gear segment and pinion being in the same horizontal plane, an elongated horizontally disposed vessel extending under the gear segment and pinion, mercury partially filling the vessel, a rack bar floating on the pinion engaging the gear segment and pinion, and blocks disposed on the bottom of the rack bar extending nearly to the bottom and sides of the vessel.

10. In a weighing scale having an indicator, a pinion through which the indicator is driven, and a load counterbalancing mechanism including a pendulum adapted to move in proportion to loads applied to the scale, a gear segment carried by said pendulum, the teeth of the gear segment and the pinion being the same width and the bottoms of the gear segment and pinion being in the same horizontal plane, a rack bar engaging the gear segment and pinion and having teeth the same width as the teeth of the gear segment and pinion and sides extended above said teeth, and an elongated mercury bath disposed beneath said gear segment and pinion on which the rack bar floats.

11. In a weighing scale having an indicator, a pinion through which the indicator is driven, and a load counterbalancing mechanism including a pendulum adapted to move in proportion to loads applied to the scale, a gear segment carried by said pendulum, the bottoms of the gear segment and pinion being in the same horizontal plane, a rack bar engaging the gear segment and pinion, and means for supporting the rack bar comprising a pair of supports pivoted at their lower ends in the same horizontal plane and held parallel with respect to each other, arcuate members carried by the upper ends of the supports and a flexible tape connecting the arcuate members, the rack bar resting on the upper surfaces of said arcuate members and being fastened to the flexible tape intermediate the ends thereof.

Signed at New York, in the county of New York and State of New York, this 5th day of June, A. D. 1930.

HUGH M. CAMERON.